United States Patent
Imai et al.

(10) Patent No.: US 9,322,488 B2
(45) Date of Patent: Apr. 26, 2016

(54) PNEUMATIC CONTROL VALVE AND ASSEMBLING METHOD THEREOF

(71) Applicant: Surpass Industry Co., Ltd., Gyoda-shi, Saitama (JP)

(72) Inventors: Takashi Imai, Gyoda (JP); Hiroki Igarashi, Gyoda (JP)

(73) Assignee: Surpass Industry Co., Ltd., Gyoda-shi (JP)

( * ) Notice: Subject to any disclaimer, the term of this patent is extended or adjusted under 35 U.S.C. 154(b) by 81 days.

(21) Appl. No.: 13/956,018

(22) Filed: Jul. 31, 2013

(65) Prior Publication Data
US 2014/0034856 A1 Feb. 6, 2014

(30) Foreign Application Priority Data
Aug. 6, 2012 (JP) ................... 2012-174146

(51) Int. Cl.
| F16K 31/12 | (2006.01) |
| F16K 31/122 | (2006.01) |
| F16K 7/17 | (2006.01) |
| F16K 27/02 | (2006.01) |

(52) U.S. Cl.
CPC ............ *F16K 31/122* (2013.01); *F16K 7/17* (2013.01); *F16K 27/0236* (2013.01); *F16K 31/1221* (2013.01); *Y10T 137/0497* (2015.04)

(58) Field of Classification Search
CPC ...... F16K 21/122; F16K 27/0236; F16K 7/17
USPC ................. 251/63.5, 63, 324; 137/315.27
See application file for complete search history.

(56) References Cited

U.S. PATENT DOCUMENTS

| 3,038,193 | A | * | 6/1962 | Harris et al. .................. 401/206 |
| 4,287,954 | A | * | 9/1981 | Krause et al. ................. 166/322 |
| 4,840,347 | A | * | 6/1989 | Ariizumi et al. ............. 251/63.4 |
| 5,520,213 | A | | 5/1996 | Muller |
| 6,196,523 | B1 | * | 3/2001 | Miyata et al. ................. 251/276 |
| 7,628,376 | B2 | * | 12/2009 | Masamura et al. .......... 251/63.6 |
| 8,689,817 | B2 | * | 4/2014 | Leys et al. ................ 137/315.05 |
| 8,840,082 | B2 | * | 9/2014 | Takeda et al. ................ 251/63.5 |
| 2002/0003222 | A1 | * | 1/2002 | Fukano et al. ............... 251/63.5 |
| 2004/0195534 | A1 | * | 10/2004 | Ijichi et al. .................. 251/63.5 |
| 2007/0075284 | A1 | * | 4/2007 | Masamura et al. .......... 251/63.5 |
| 2009/0020722 | A1 | | 1/2009 | Masamura |
| 2009/0166574 | A1 | * | 7/2009 | Hagihara ...................... 251/366 |

(Continued)

FOREIGN PATENT DOCUMENTS

| JP | 2002-243062 A | 8/2002 |
| JP | 2008-291942 A | 12/2008 |
| JP | 2009-024812 A | 2/2009 |

*Primary Examiner* — Marina Tietjen
*Assistant Examiner* — Umashankar Venkatesan
(74) *Attorney, Agent, or Firm* — Winstead PC

(57) ABSTRACT

To provide a pneumatic control valve including: a valve body 10; a valve opening/closing mechanism section 20; a pneumatic control section 60 for the valve opening/closing mechanism 20 that is coupled to the valve element 21 via a piston stem 62; a diaphragm 30 that defines a partition between a fluid and the pneumatic control section 60; a cylindrical lower stopper 40 that is fixed to the valve body 10 as anti-falling off for the valve element 21 and the diaphragm 30 inserted into a valve chamber 13, and supports movement of the piston stem 62; and a cylindrical upper stopper 50 that is fixed to the valve body 10 as anti-falling off for the piston stem 62 inserted into a piston chamber 15, and supports movement of the piston stem 62.

4 Claims, 7 Drawing Sheets

(56) References Cited

U.S. PATENT DOCUMENTS

| | | |
|---|---|---|
| 2009/0242818 A1* | 10/2009 | Leys et al. .................... 251/321 |
| 2010/0180963 A1 | 7/2010 | Igarashi |
| 2011/0106060 A1* | 5/2011 | Atkinson et al. .............. 604/544 |
| 2011/0309284 A1* | 12/2011 | Yamada et al. ............... 251/324 |
| 2012/0174997 A1* | 7/2012 | Yamada et al. ............... 137/551 |
| 2014/0052101 A1* | 2/2014 | Stroup .......................... 604/506 |

* cited by examiner

PNEUMATIC CONTROL VALVE AND ASSEMBLING METHOD THEREOF

TECHNICAL FIELD

The present invention relates to a pneumatic control valve for use in fluid transfer pipes to open and close a fluid flow path in various industrial fields of chemical plants, semiconductor manufacturing, food, biotechnology or the like, and an assembling method thereof.

BACKGROUND ART

A valve that opens and closes a fluid flow path by vertically moving a plug-type (rod-like) valve element within a valve chamber has been known as one of conventional valves for handling fluids such as chemicals. Examples of the opening/closing valve include a manual valve that opens and closes a valve element by manual operation, and a pneumatic control valve (pneumatic on-off valve) that is provided with an actuator operated by pneumatic pressure so as to enable remote operation as disclosed in, for example, PTL 1 below. Examples of the pneumatic control valve include a pneumatic control valve of normally open type in which a valve is opened when no pneumatic pressure is supplied, and a pneumatic control valve of normally closed type in which a valve is closed when no pneumatic pressure is supplied depending on a difference in a pressure application direction from a pneumatic actuator on a piston and an urging direction by a spring member, or the like.

The aforementioned pneumatic control valve includes an actuator operated by pneumatic pressure, and opens and closes a fluid flow path by vertically moving a plug-type valve element within a valve chamber. The fluid flow path includes an inlet-side flow path that brings into communication the valve chamber formed in a valve body and a flow path inlet, and an outlet-side flow path that communicates with a flow path outlet via a vertical portion extending downward from a bottom surface portion of the valve chamber.

When the aforementioned pneumatic control valve is of normally open type, a spring member that upwardly urges the valve element so as to hold a fully open position is also provided at a stem portion. To close the pneumatic control valve, pneumatic pressure is supplied to a pressure receiving surface of the actuator so as to generate a downward force larger than the urging of the spring member.

The aforementioned pneumatic control valve further includes a diaphragm that is provided so as to separate the valve chamber in which a fluid flows and an opening/closing mechanism in a liquid-tight manner. The diaphragm separates the valve chamber that forms a space in which the valve element is vertically moved and communicates with the inlet-side flow path and the vertical portion to define a portion of the flow path in which a fluid flows, and an accommodation space for the stem portion that is formed above the valve element so as to couple the valve element to the actuator, place the spring member, or the like. The diaphragm prevents a coagulable fluid such as a slurry chemical from flowing into the opening/closing mechanism of the valve element.

The conventional pneumatic control valve has such a structure that casing bodies divided into, for example, the valve mechanism side and the actuator side are integrally coupled together by vertically tightening a plurality of bolts arranged at equal intervals so as to prevent leakage.

CITATION LIST

Patent Literature

{PTL 1}
Japanese Unexamined Patent Application, Publication No. 2008-291942

SUMMARY OF INVENTION

Technical Problem

There is an increasing demand for performance improvement and size reduction in apparatuses constructed using the aforementioned pneumatic control valve. Based on the background, there is also a demand for further performance improvement and further size reduction in the pneumatic control valve. In the aforementioned pneumatic control valve, the reliability and durability of the diaphragm need to be further improved at the same time. The conventional pneumatic control valve is required to be further reduced in size while maintaining or improving the reliability and durability.

To solve the above problem, it is an object of the present invention to provide a pneumatic control valve which can further improve the reliability and durability and can be reduced in size, and an assembling method thereof. It is also an object of the present invention to reduce the cost of the pneumatic control valve.

Solution to Problem

To achieve the above objects, the present invention employs the following solutions.

A pneumatic control valve according to the present invention includes: a valve body that forms therein a substantially columnar space as a valve chamber and a piston chamber, and is provided with an inflow path and an outflow path for a fluid; a valve opening/closing mechanism section that opens and closes a fluid flow path by vertically moving a valve element within the valve chamber; a pneumatic control section that is coupled to the valve element via a piston stem to work as an opening/closing actuator for the valve opening/closing mechanism; a diaphragm that is coupled to the valve element on its inner circumferential side to define a partition between a fluid and the pneumatic control section within the valve chamber; a cylindrical lower stopper that is inserted from an upper opening as anti-falling off for the valve element and the diaphragm inserted into the valve chamber from the upper opening, is fixed to the valve body, and works as a lower guide to support movement of the piston stem; and a cylindrical upper stopper that is inserted from the upper opening as anti-falling off for the piston stem inserted into the piston chamber from the upper opening, is fixed to the valve body, and works as an upper guide to support movement of the piston stem.

In accordance with the pneumatic control valve of the present invention, the valve element with the diaphragm that is inserted from the upper opening into the valve chamber formed within the valve body is pressed from above by the lower stopper similarly inserted from the upper opening, and thereby prevented from falling off and rotating by fixing the lower stopper within the piston chamber. The piston stem coupled to the valve element is also prevented from falling off and rotating by fixing the upper stopper inserted from the upper opening to the valve body. The piston stem is guided by the cylindrical upper and lower stoppers, and thereby smoothly moved in an axial direction.

That is, the pneumatic control valve can be assembled by sequentially inserting the constituent components such as the valve element with the diaphragm, the lower stopper, the piston stem, and the upper stopper from the upper opening into the valve chamber and the piston chamber formed within the valve body, and fixing the components therein. Since the valve body and the pneumatic control section are integrated together in the pneumatic control valve, a manufacturing process of tightening bolts or the like, which is required in a divided structure, is eliminated, and the number of components such as bolts is reduced.

In the above invention, the lower stopper may be fixed by engagement between a concave groove portion provided in an inner wall of the piston chamber and a flanged convex portion provided on an outer wall, and insertion of an anti-rotation pin from the valve body into the lower stopper or heat welding between the valve body and the lower stopper. Accordingly, the engagement between the concave groove portion and the flanged convex portion defines a vertical movable region of the valve element and the diaphragm within the valve chamber. The fixation using the anti-rotation pin or the heat welding further prevents axial rotation of the valve element and the diaphragm.

In this case, the engagement between the concave groove portion and the flanged convex portion may separate an upper surface of the diaphragm and a compression chamber of the pneumatic control section.

In the above invention, the upper stopper may be fixed by insertion of a pin from the valve body into the upper stopper or heat welding between the valve body and the upper stopper, and anti-rotation obtained by engaging a convex portion on the piston stem side with a concave portion on the stopper side. Accordingly, the fixation by the insertion of the pin or the heat welding provides anti-falling off for the piston stem, and the engagement between the convex portion and the concave portion prevents axial rotation of the piston stem.

In the above invention, a coupling portion between the valve element and the piston stem may be prevented from axial rotation. Accordingly, the valve element and the diaphragm can be prevented from axial rotation to damage the diaphragm.

A method for assembling a pneumatic control section according to the present invention includes the steps of: inserting a valve element, to which a diaphragm is coupled, from an upper opening into a valve chamber formed within a resin valve body including an inflow path and an outflow path for a fluid; press-fitting a resin cylindrical lower stopper from the upper opening as anti-falling off for the valve element and the diaphragm, and fixing the lower stopper to the valve chamber while preventing the lower stopper from rotating; inserting a piston stem from the upper opening, and coupling the piston stem to an upper portion of the valve element while preventing axial rotation; and inserting a spring member around an outer circumference of the piston stem from the upper opening, and then inserting a resin cylindrical upper stopper as anti-falling off and anti-rotation for the piston stem to close the upper opening.

The method for assembling a pneumatic control valve includes the steps of: inserting a valve element, to which a diaphragm is coupled, from an upper opening into a valve chamber formed within a resin valve body including an inflow path and an outflow path for a fluid; press-fitting a resin cylindrical lower stopper from the upper opening as anti-falling off for the valve element and the diaphragm, and fixing the lower stopper to the valve chamber while preventing the lower stopper from rotating; inserting a piston stem from the upper opening, and coupling the piston stem to an upper portion of the valve element while preventing axial rotation; and inserting a spring member around an outer circumference of the piston stem from the upper opening, and then inserting a resin cylindrical upper stopper as anti-falling off and anti-rotation for the piston stem to close the upper opening. Thus, the pneumatic control valve can be assembled by sequentially inserting the constituent components such as the valve element with the diaphragm, the lower stopper, the piston stem, and the upper stopper from the upper opening into the valve chamber of the valve body, and fixing the components therein. Accordingly, a manufacturing process of tightening bolts or the like, which is required in a divided structure, can be eliminated, and the number of components such as bolts can be reduced.

Advantageous Effects of Invention

In accordance with the present invention described above, since the valve body and the pneumatic control chamber are integrated together in the pneumatic control valve, the manufacturing process of tightening bolts or the like can be eliminated, the number of components can be reduced, and the product cost can be lowered.

Since the valve body and the pneumatic control chamber are integrated together in the pneumatic control valve of the present invention described above, the reliability against leakage and the durability for long-term use are improved as compared to a conventional product.

In particular, in the pneumatic control valve of the present invention described above, no bolting is required unlike in the conventional product, so that the product can be reduced in size. Accordingly, apparatuses constructed using the pneumatic control valve can be also easily reduced in size while ensuring the reliability and durability.

BRIEF DESCRIPTION OF DRAWINGS

FIG. 2(a) is a plan view; FIG. 2(b) is a front view; and FIG. 2(c) is a left side view.

DESCRIPTION OF EMBODIMENTS

Figure 1:
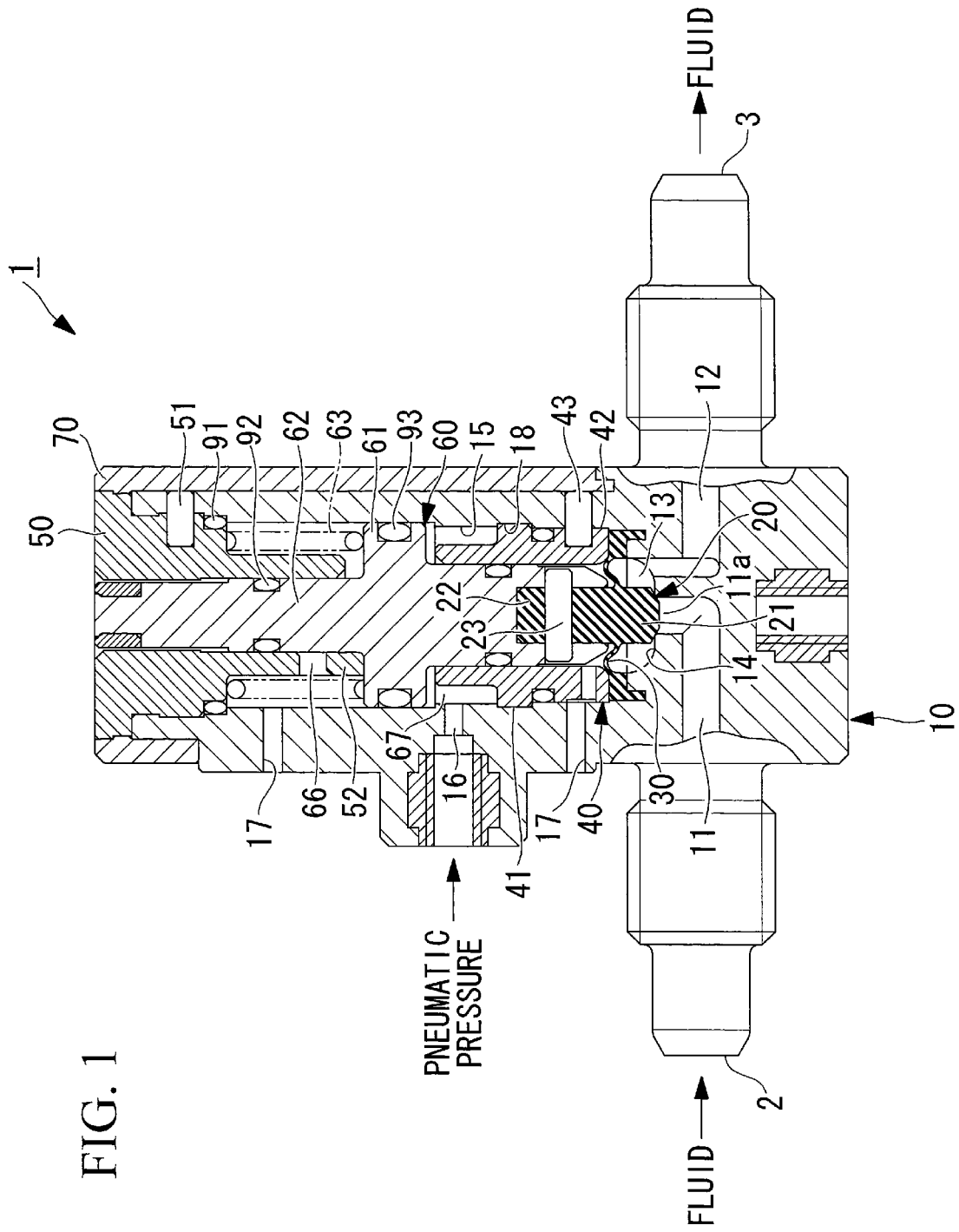
FIG. 1 is a vertical sectional view illustrating a configuration example of a pneumatic control valve of normally closed type as one embodiment of the present invention.
Figure 2:
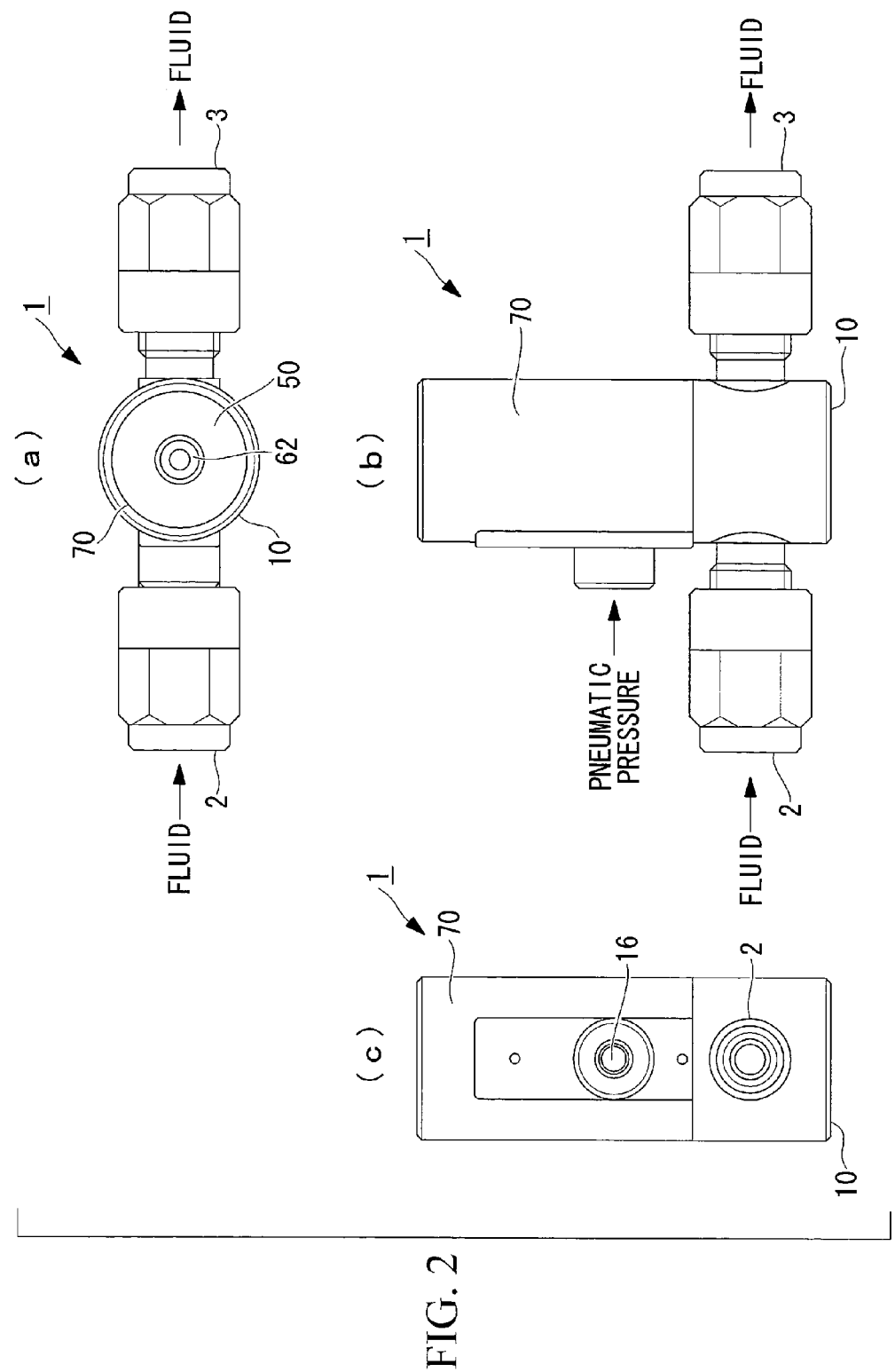
FIG. 2 are external views of the pneumatic control valve shown in FIG. 1.

In the following, one embodiment of a pneumatic control valve according to the present invention will be described based on the drawings.

A pneumatic control valve 1 of normally closed type shown in FIGS. 1 to 5 is installed at a pipe flow path in which, for example, a slurry chemical flows as a fluid. The pneumatic control valve 1 has a function to open and close a flow path that causes a fluid entering from a flow path inlet 2 to flow out from a flow path outlet 3. The pneumatic control valve 1 can also remotely control the opening and closing of a valve opening/closing mechanism 20 by an actuator using pneumatic pressure.

The pneumatic control valve 1 of the present embodiment includes, as main constituent elements, a valve body 10 that forms a casing, the valve opening/closing mechanism section 20 that opens and closes a fluid flow path by vertically moving a valve element 21, a diaphragm 30 that is coupled to the valve element 21, and a pneumatic control section 60 that works as the actuator for the valve opening/closing mechanism 20. The diaphragm 30 in this case is provided so as to define a partition between a fluid flowing through the fluid flow path and the pneumatic control section 60.

The valve body 10 is a member made of resin, and includes a fluid inflow path 11 in communication with the flow path inlet 2, and a fluid outflow path 12 in communication with the flow path outlet 3. A space communicating with the inflow path 11 and the outflow path 12 is formed within the valve body 10. The space defines a valve chamber 13 in which the valve opening/closing mechanism 20 is accommodated.

A bottom surface portion of the valve chamber 13 is formed in a bowl-like shape, and a valve seat 14 is provided in the bottom surface portion. A vertical portion outlet 11a of the inflow path 11 is open in a center portion located at a lowest position in the valve seat 14. The valve body 10 also includes a substantially columnar space that defines a piston chamber 15 formed integrally with the valve body 10 so as to continue from an upper portion of the valve chamber 13. That is, a substantially columnar space, which defines the valve chamber 13 and the piston chamber 15, is formed within the valve body 10. An upper end portion of the piston chamber 15 has an upper opening in communication with outside.

A pneumatic pressure introduction flow path 16, and a pair of upper and lower vent holes 17 of the pneumatic control section 60 described below are provided in an inner wall (side wall) of the piston chamber 15. The vent holes 17 are exhaust ports provided above and below a region in which a piston 61 described below moves so as to facilitate smooth movement of the piston 61 and the valve element 21.

A horizontal locking groove 18 is also provided over the entire circumference of the inner wall surface of the piston chamber 15. The locking groove 18 is a concave groove portion with which a flanged convex portion 41 of a lower stopper 40 described below is engaged.

The valve opening/closing mechanism section 20 is a constituent element that opens and closes the fluid flow path by vertically moving the valve element 21 within the valve chamber 13. The valve opening/closing mechanism 20 includes the valve element 21 that fully closes the fluid flow path by close contact with the valve seat 14, a valve stem 22 that is provided continuously from and integrally with an upper portion of the valve element 21, and a valve stem pin 23 that integrates the valve element 21 with a piston stem 62 described below.

The valve opening/closing mechanism section 20 also includes the diaphragm 30 that is coupled to an outer circumferential portion of the valve element 21. The diaphragm 30 is a member having a doughnut-like shape in plan view that is coupled to the valve element 21 on the axial center side (inner circumferential side) of the valve stem 22 and completely separates the fluid and the pneumatic control section 60 by defining a partition therebetween within the valve chamber 13.

Figure 3:
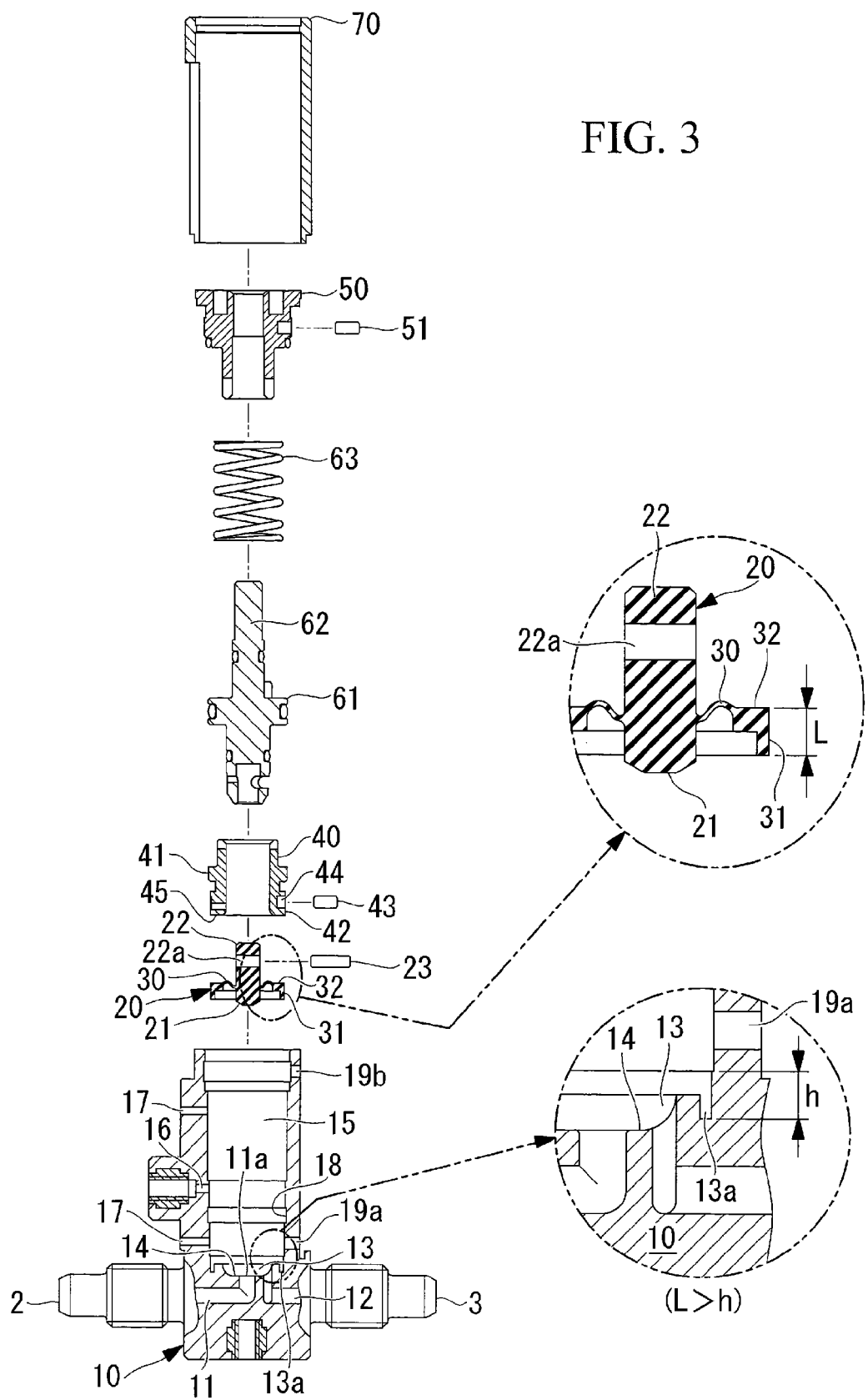
FIG. 3 is an exploded view of the pneumatic control valve shown in FIG. 1.
Figure 4:
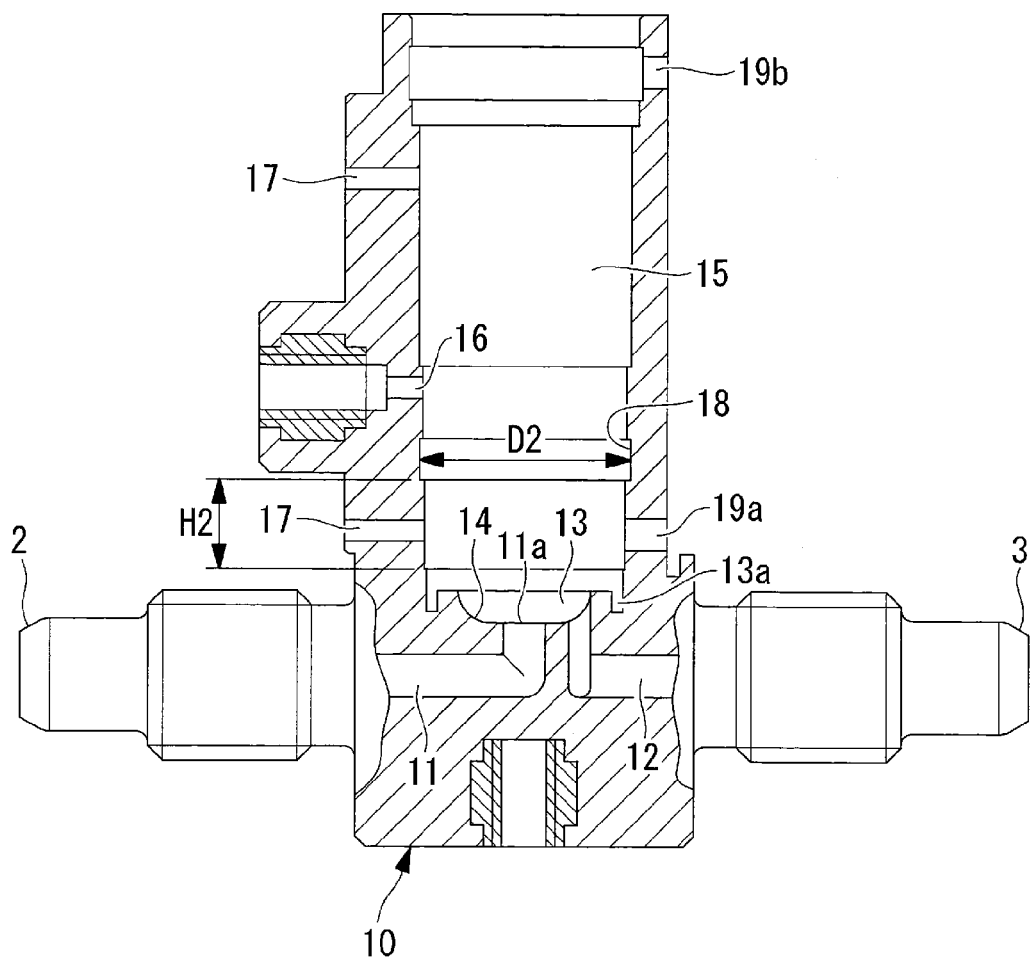
FIG. 4 is an explanatory view illustrating a main-portion dimensional relationship between a valve body and a lower stopper in the pneumatic control valve shown in FIG. 1.

A convex portion 31 as a seal portion is provided downwardly on an outer circumferential portion of the diaphragm 30 as shown in, for example, FIG. 3. The convex portion 31 is inserted into a concave portion 13a formed in an outer circumferential portion inside the valve chamber 13. Here, a vertical length L of the convex portion 31 is set to be larger than a depth h of the concave portion 13a (L>h). Thus, the convex portion 31 having the length L is pressed from above by the lower stopper 40 described below and thereby crushed when inserted into the concave portion 13a.

As a result, the diaphragm 30 is installed within the valve chamber 13 while sealing a space between the valve chamber 13 and the pneumatic control section 60. That is, the pressed and crushed convex portion 31 prevents the fluid flowing into the valve chamber 13 from flowing out into the pneumatic control section 60.

Since the pressed and crushed convex portion 31 is pressed from above by the lower stopper 40, the convex portion 31 is fixed so as not to fall off for a long period of time, and further functions as anti-rotation to prevent axial rotation of the valve element 21. A bottom surface 45 formed at a lower end portion of the lower stopper 40 is set to the same shape and area as those of an upper end surface 32 of the diaphragm 30. Therefore, a seal surface is equally pressed thereto to effect sealing.

The diaphragm 30 is made of a material having not only strength to withstand fluid pressure and pneumatic pressure, but also flexibility to follow the opening and closing of the valve element 21, and durability against the fluid such as chemicals.

The pneumatic control section 60 includes the piston stem 62 with the piston 61 that projects from an outer circumferential surface in a flange-like shape. The pneumatic control section 60 is supported such that the piston 61 can vertically slide within the valve body 10 upon receiving pneumatic pressure. The piston stem 62 is coupled to the valve element 21 so as to vertically move together by inserting the valve stem pin 23 into a lower end portion of the piston stem 62.

Since the pneumatic control valve 1 is of normally closed type, the pneumatic control section 60 is normally urged downward by a coil spring 63 to bring the valve element 21 into a fully closed state. However, upon receiving pneumatic pressure on a lower surface of the piston 61, the pneumatic control section 60 raises the valve element 21 against the urging by the coil spring 63. Accordingly, the pneumatic control valve 1 is switched from the fully closed state to a fully open state.

The lower stopper 40 is a cylindrical member made of resin that is inserted from the upper opening of the piston chamber 15 as anti-falling off for the valve element 21 and the diaphragm 30 inserted into the valve chamber 13 from the upper opening. The lower stopper 40 is fixed within the valve body 10, and also functions as a lower guide that supports movement of the piston stem 62 (vertical movement in the opening and closing of the valve).

The flanged convex portion 41 that is engaged with the locking groove 18 described above is provided on an outer circumferential surface of the lower stopper 40. The flanged convex portion 41 enters the locking groove 18 to be engaged therewith, thereby preventing axial movement of the stopper 40. In this case, when the flanged convex portion 41 is press-fit into the piston chamber 15, the resin cylindrical member is elastically deformed. The flanged convex portion 41 thus passes through the piston chamber with its diameter reduced, and is then restored to its original diameter and engaged with the locking groove 18 when reaching the locking groove 18.

That is, in the lower stopper 40, an outer diameter D1 of the flanged convex portion 41 is set to a maximum outer diameter value slightly larger than an inner diameter of the piston chamber 15. When the flanged convex portion 41 enters the locking groove 18 having a diameter D2 to be engaged therewith, the lower stopper 40 becomes restricted in axial movement with respect to the valve body 10. In this case, the outer diameter D1 of the flanged convex portion 41 has a slightly larger value than the diameter D2 of the locking groove 18 (D1>D2) as shown in, for example, FIG. 4.

The lower stopper 40 also includes a diaphragm holding portion 42 having a length H1 that is provided on a lower end side of the flanged convex portion 41. The diaphragm holding portion 42 is a member that holds the outer circumferential portion of the diaphragm 30 installed close to an upper end portion of the valve chamber 13, that is, close to a border between the valve chamber 13 and the piston chamber 15 by downwardly pressing the outer circumferential portion from the upper piston chamber 15 side.

A dimension (depth) H2 of a lower portion of the piston chamber 15, into which the diaphragm holding portion 42 is inserted, from a lower end of the locking groove 18 to the upper surface of the diaphragm is set to a slightly smaller value than the length H1 of the lower stopper 40 (H1>H2).

The lower stopper 40 is fixed by engagement between the locking groove 18 provided in the inner wall of the piston chamber 15 and the flanged convex portion 41 provided on the outer wall of the lower stopper 40, and insertion of an anti-rotation pin 43 from the valve body 10 into the lower stopper 40. In this case, the lower stopper 40 being inserted into the piston chamber 15 having substantially the same diameter is prevented from axial movement by the engagement between the locking groove 18 and the flanged convex portion 41, and further prevented from rotational movement and axial movement by the anti-rotation pin 43. The lower stopper 40 can be thereby reliably fixed against the opening and closing of the valve element 21.

The engagement between the locking groove 18 and the flanged convex portion 41 described above prevents the axial movement of the lower stopper 40, and thus functions as a stopper that defines a vertical movable region of the valve element 21 and the diaphragm 30 within the valve chamber 13.

The fixation using the anti-rotation pin 43 further prevents axial rotation of the valve element 21 and the diaphragm 30.

In this case, the engagement between the locking groove 18 and the flanged convex portion 41 preferably separates the upper surface of the diaphragm 30 and a compression chamber 67 of the pneumatic control section 60.

An upper stopper 50 is a cylindrical member made of resin that is inserted from the upper opening of the piston chamber 15 as anti-falling off for the piston stem 62 inserted into the valve chamber 13 and the piston chamber 15 from the upper opening. The upper stopper 50 is fixed to the valve body 10 with a pin 51, and also functions as an upper guide that supports movement of the piston stem 62 (vertical movement in the opening and closing of the valve).

A vertical slit 66 that functions as anti-rotation to prevent axial rotation of the piston stem 62 and the valve element 21 by engagement with a convex portion 52 provided on the piston stem 62 or the piston 61 is provided in a lower end portion of the upper stopper 50.

Although a cylindrical cover 70 as an opaque resin molding is attached to the pneumatic control valve 1 in the drawings so as to cover the piston chamber 15 or the like of the valve body 10 molded from transparent resin, the present invention is not limited thereto.

Also, an O-ring or the like is appropriately placed at a portion required to be sealed. More specifically, O-rings 91, 92, and 93 shown in, for example, FIG. 1 work as seals that prevent leakage of pneumatic pressure supplied into the piston chamber 15.

That is, the pneumatic control valve 1 of the present embodiment described above includes: the resin valve body 10 that forms the substantially columnar space as the valve chamber 13 and the piston chamber 15, and is provided with the inflow path 11 and the outflow path 12 for the fluid; the valve opening/closing mechanism section 20 that opens and closes the fluid flow path by vertically moving the valve element 21 within the valve chamber 13; the pneumatic control section 60 that is coupled to the valve element 21 via the piston stem 62 to work as the opening/closing actuator for the valve opening/closing mechanism 20; the diaphragm 30 that is coupled to the valve element 21 on the inner circumferential side to define a partition between the fluid and air supplied to the pneumatic control section 60 within the valve chamber 13; the resin cylindrical lower stopper 40 that is inserted from the upper opening as the anti-falling off for the valve element 21 and the diaphragm 30 inserted into the valve chamber 13 from the upper opening, is fixed within the valve chamber 13, and works as the lower guide to support the movement of the piston stem 62; and the resin cylindrical upper stopper 50 that is inserted from the upper opening as the anti-falling off for the piston stem 62 inserted into the piston chamber 15 from the upper opening, is fixed to the valve body 10, and works as the upper guide to support the movement of the piston stem 62.

In the pneumatic control valve 1 having the aforementioned configuration, the valve element 21 including the diaphragm 30 that is inserted from the upper opening into the valve chamber 13 formed within the valve body 10 is pressed from above by the lower stopper 40 similarly inserted from the upper opening, and thereby prevented from falling off and rotating by fixing the lower stopper 40 to the valve body 10. The piston stem 62 coupled to the valve element 21 is also prevented from falling off and rotating by fixing the upper stopper 50 inserted from the upper opening to the valve body 10. Moreover, the piston stem 62 is guided by the cylindrical upper and lower stoppers 50 and 40, that is, smoothly moved in the axial direction with the upper stopper 50 and the lower stopper 40 guiding the opening and closing operation.

As a result, the pneumatic control valve 1 can be assembled by sequentially inserting the constituent components such as the valve element 21 with the diaphragm, the lower stopper 40, the piston stem 62, and the upper stopper 50 from the upper opening into the valve chamber 13 and the piston chamber 15 formed within the valve body 10, and fixing the components therein. Thus, an assembling and fixing operation using bolts as in a conventional structure becomes unnecessary.

In the following, an assembling method for the pneumatic control valve 1 having the aforementioned configuration will be described in detail based on FIG. 3.

At first, in a first step, the valve element 21 to which the diaphragm 30 is coupled is inserted from the upper opening into the valve chamber 13 formed within the valve body 10. At this point, the valve stem pin 23 is preliminarily inserted into a pin hole 22a of the valve stem 22. The valve stem pin 23 has a length slightly shorter than or corresponding to the inner diameter of the piston chamber 15.

After the valve element 21 is placed at a predetermined position, in a second step, the resin cylindrical lower stopper 40 is press-fit from the upper opening of the valve body 10 as the anti-falling off for the valve element 21 and the diaphragm 30. The lower stopper 40 is also fixed to the valve body 10 and prevented from rotating. The lower stopper 40 is fixed by inserting the anti-rotation pin 43 that penetrates through the valve body 10 to reach the wall surface of the lower stopper 40 in addition to the concave-convex engagement between the locking groove 18 and the flanged convex portion 41. Reference character 19a in FIG. 3 denotes a pin hole in the valve body 10, into which the anti-rotation pin 43 is inserted. A distal end portion of the anti-rotation pin 43 is inserted into a pin hole 44 of the lower stopper 40.

In a subsequent third step, the piston stem 62 is inserted from the upper opening of the valve body 10, and coupled to the upper portion of the valve element 21 while preventing the axial rotation.

Figure 5:
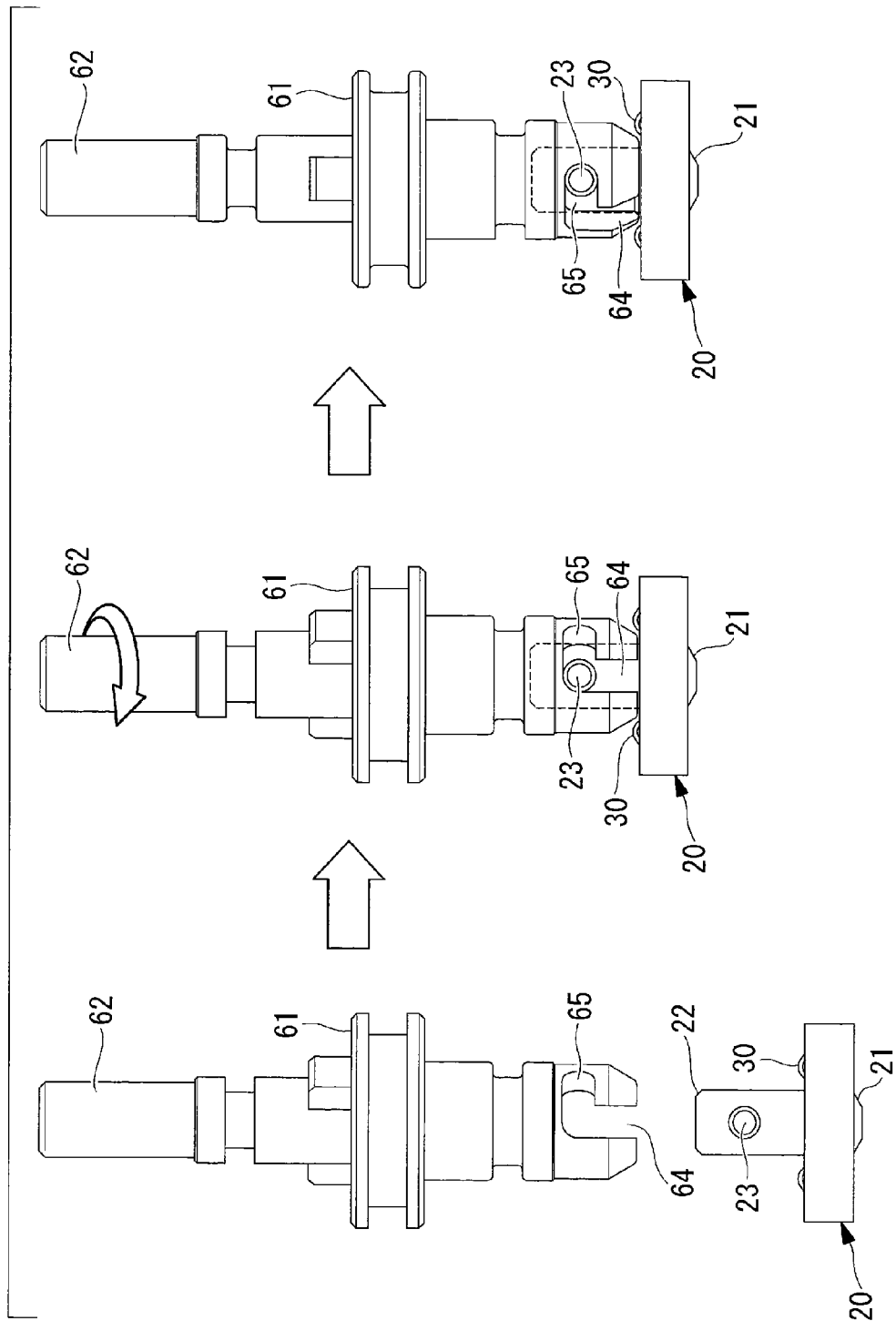
FIG. 5 is an explanatory view illustrating an assembling sequence of coupling a valve stem and a piston stem in the pneumatic control valve shown in FIG. 1.

More specifically, a substantially columnar space portion (not shown) including a vertical pin path 64 that radially (horizontally) penetrates to both sides is provided in the lower end portion of the piston stem 62 such that an upper end portion of the valve stem 22 and the valve stem pin 23 are inserted therein and moved upward as shown in, for example, FIG. 5. A horizontal pin path 65 with a circular section is also provided on an upper end side of the space portion so as to allow horizontal rotational movement of the valve stem pin 23. The horizontal pin path 65 is provided in such an angle range that the valve stem pin 23 passing through the vertical pin path 64 can be relatively rotated by at least a distance corresponding to the diameter of the pin. The diameter of the horizontal pin path 65 is substantially the same as the valve stem pin 23.

Therefore, when the piston stem 62 is inserted from above to the valve element 21 that is held at a predetermined position by the lower stopper 40, the upper end portion of the valve stem 22 and the valve stem pin 23 enter the vertical pin path 64 and the space portion. After that, the piston stem 62 is rotated in a clockwise direction until the valve stem pin 23 comes into abutment against a vertical wall existing in the back of the horizontal pin path 65 at a predetermined position at which an upper surface of the valve stem pin 23 abuts against an upper wall surface of the horizontal pin path 65.

As a result, the valve element 21 having a larger diameter than the inner diameter of the lower stopper 40, and the piston stem 62 are easily coupled together. The valve element 21 and the piston stem 62 can be thereby integrally opened and closed in the axial direction by the operation of the valve stem pin 23. The valve element 21 and the piston stem 62 coupled together are prevented from axial rotation by inserting the upper stopper 50 as described below.

Finally, in a fourth step, after the coil spring 63 is inserted around the outer circumference of the piston stem 62 from the upper opening, the resin cylindrical upper stopper 50 is inserted as the anti-falling off and the anti-rotation for the piston stem 62. By inserting the upper stopper 50, the upper opening of the piston chamber 15 is closed by the upper stopper 50 and the piston stem 62.

The upper stopper 50 is prevented from rotating and falling off by using one or a plurality of pins 51.

When the upper stopper 50 is inserted, the convex portion on the piston stem side, i.e., the convex portion 52 provided on the piston stem 62 or the piston 61, and the concave portion on the stopper side, i.e., the slit 66 of the upper stopper 50 are engaged together. Therefore, the axial rotation of the piston stem 62 and the valve element 21 can be prevented.

In this case, the convex portion 52 on the piston stem side may be provided at at least one position. The number of the slits 66 on the stopper side, which is similarly provided at one or a plurality of positions, needs to be equal to or larger than the number of the convex portions 52. Moreover, the slit 66 can be also used for circumferential positioning of the insertion position of the upper stopper 50. As the depth (in the vertical direction), the slit has a stroke length with which the opening and closing of the valve element 21 is not disturbed.

In the configuration example in the drawings, the cover 70 is attached so as to cover the outer circumference of the valve body 10 after completion of assembling. The cover 70 is attached in order to improve design or hide the internal structure when, for example, the valve body 10 is made of transparent resin. The cover 70 may be provided if necessary.

Therefore, in accordance with the assembling method of the present embodiment described above, the pneumatic control valve 1 can be assembled by sequentially inserting the constituent components such as the valve element 21 with the diaphragm, the lower stopper 40, the piston stem 62, the coil spring 63, and the upper stopper from the upper opening into the valve chamber 13 of the valve body 10, and fixing the components therein. Thus, an operation of integrally assembling and fixing components by tightening bolts becomes unnecessary in the assembling of the pneumatic control valve 1. The pneumatic control valve 1 can be thereby easily and reliably reduced in size without deteriorating the reliability and durability of the diaphragm 30 and against leakage.

That is, as compared to a conventional square structure in which components are integrally assembled and fixed by tightening bolts at four corners, shape restrictions due to bolts are eliminated in the configuration of the present embodiment in which no fixing bolt is required. Thus, size reduction is achieved by forming the valve body 10 in a circular shape in plan view. In other words, in the conventional square structure using bolts, a width of about 22 mm is considered to be a minimum value in the size reduction. However, in the case of the present embodiment using no bolt, the external dimensions of the valve body 10 can be reduced to at least a diameter of about 16 mm. In particular, the structure of the pneumatic control valve 1 of the present embodiment described above is suitable for a fluid flow path having a relatively small diameter.

Accordingly, various apparatuses constructed using the pneumatic control valve 1 can be also easily reduced in size while ensuring the reliability and durability.

Figure 6:
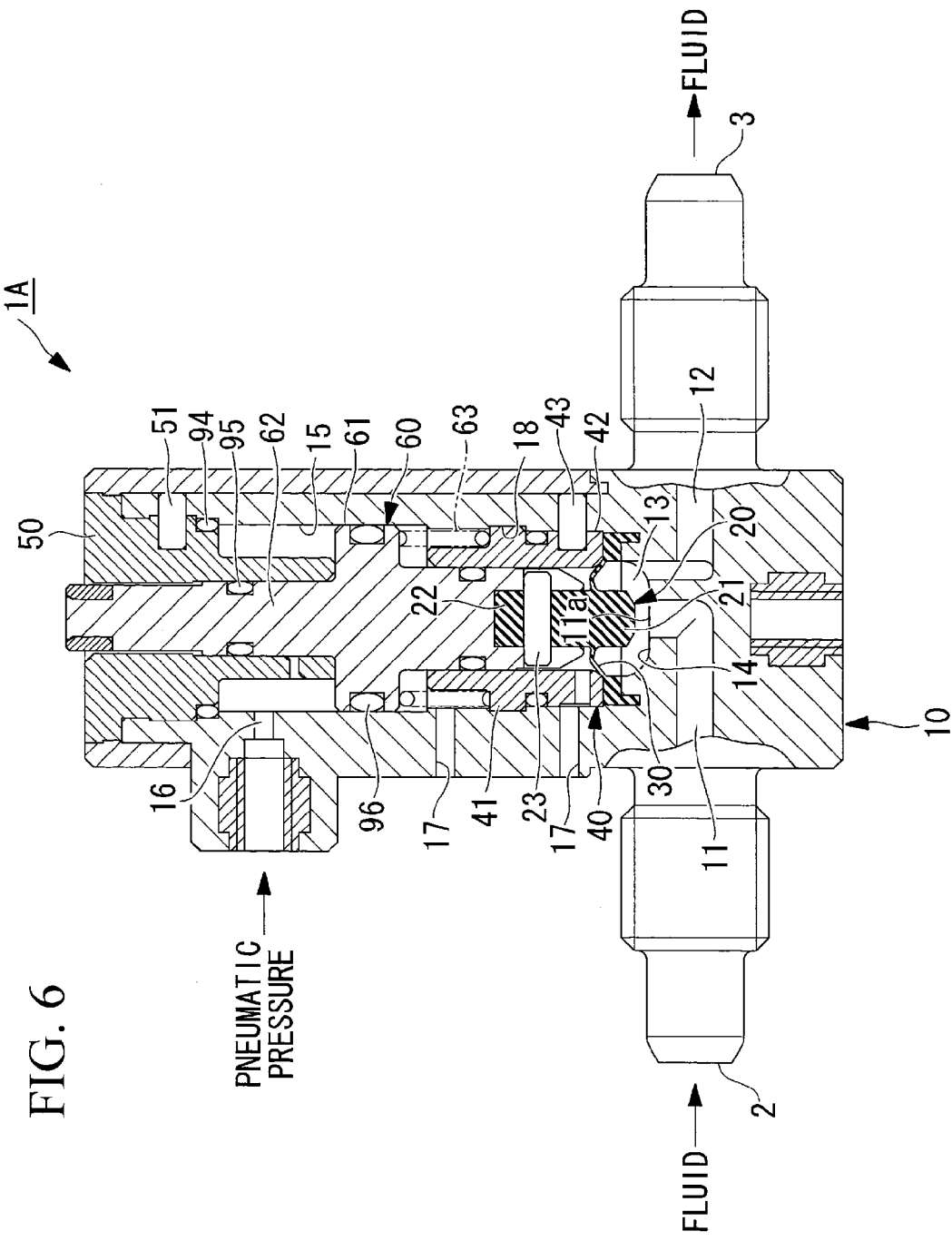
FIG. 6 is a vertical sectional view illustrating a configuration example of a pneumatic control valve of normally closed type according to the present invention.

Although it has been described that the pneumatic control valve 1 is of normally closed type in the aforementioned embodiment, the similar structure and assembling method can be applied to a pneumatic control valve 1B of normally open type as shown in FIG. 6. In this case, the positions of the pneumatic pressure introduction flow path 16 for supplying pneumatic pressure and the vent holes 17 are inverted based on the piston 61. In the pneumatic control valve 1B of normally open type, the position of the coil spring 63 is also inverted based on the piston 61.

In this case, O-rings 94, 95, and 96 shown in FIG. 6 work as seals that prevent leakage of pneumatic pressure supplied into the piston chamber 15.

Figure 7:
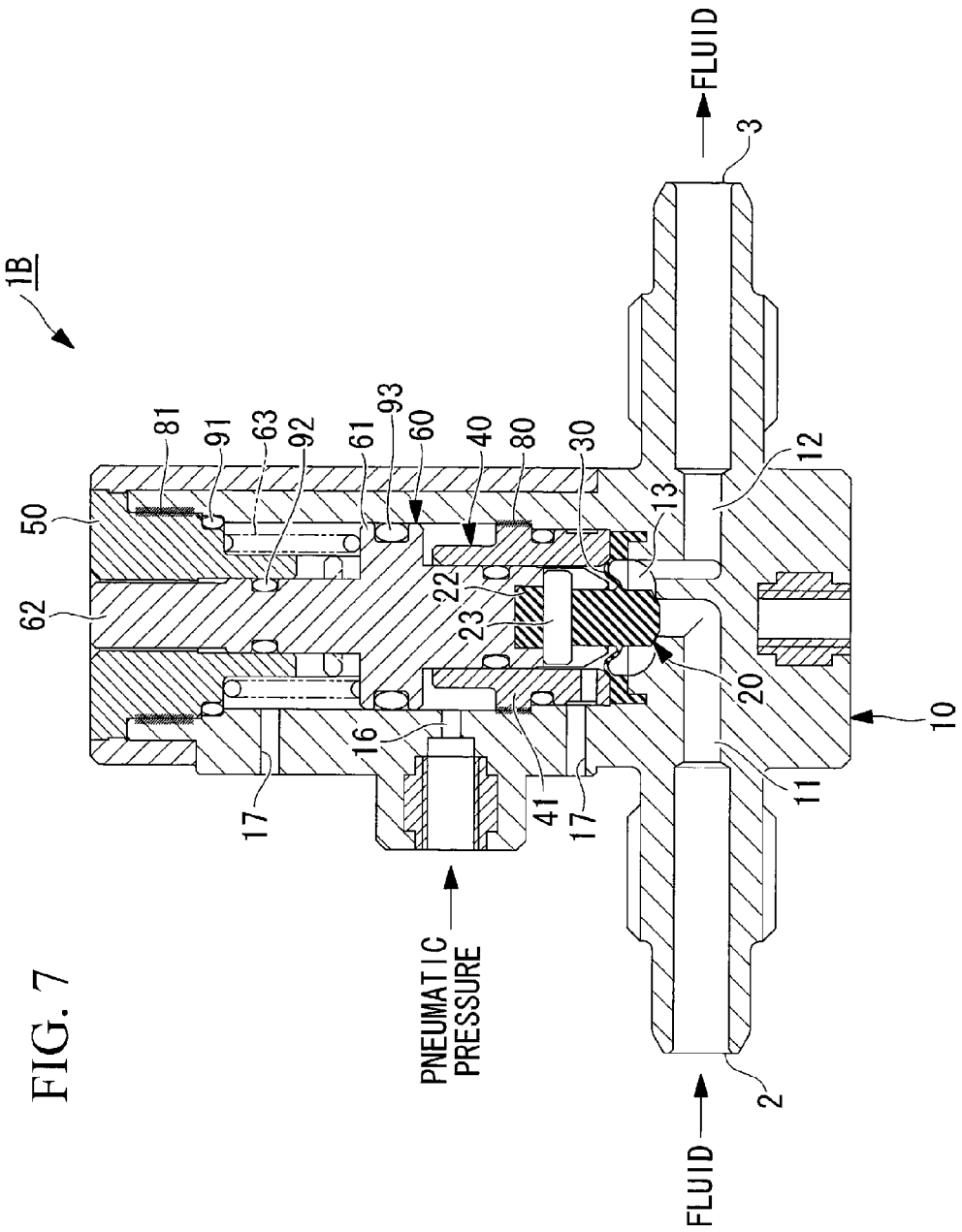
FIG. 7 is a vertical sectional view illustrating a configuration example of a pneumatic control valve of normally open type using heat welding as a modification of the present invention.

In a pneumatic control valve 1B of a modification shown in FIG. 7, heat welding such as ultrasonic welding is used to fix the lower stopper 40 and the upper stopper 50 instead of the concave-convex engagement, the anti-rotation pin 43 and the pin 51.

More specifically, in the lower stopper 40, an outer circumferential surface of the flanged convex portion 41 is fixed to the inner wall of the valve body 10 with a heat welding portion 80. Thus, the anti-rotation pin 43 is not used. In this case, the valve body 10 and the flanged convex portion 41 are preferably heat-welded with the concave-convex engagement between the locking groove 18 and the flanged convex portion 41. In the upper stopper 50, an outer circumferential surface of the upper stopper 50 is fixed to the inner wall of the valve body 10 with a heat welding portion 81.

As described above, the pneumatic control valves 1, 1A, and 1B of the present embodiments described above can be assembled by using no bolt. The pneumatic control valves 1, 1A, and 1B can be thereby reduced in size without deteriorating the reliability and durability of the diaphragm 30 and against fluid leakage. As compared to the structure using bolts, washers or the like become unnecessary, so that the number of components can be also reduced.

Accordingly, various apparatuses constructed using the pneumatic control valves 1, 1A, and 1B can be also easily reduced in size while ensuring the reliability and durability.

The present invention is not limited to the aforementioned embodiments, and may be changed as appropriate without departing from the scope of the invention.

The invention claimed is:

1. A pneumatic control valve comprising:
a valve body having formed therein a substantially columnar space, the substantially columnar space comprising an inflow path and an outflow path for a fluid;
a valve chamber and a piston chamber provided within the substantially columnar space the piston chamber being defined by a cylindrical side wall formed by the valve body;
a piston member provided in the piston chamber so as to slidably move along the cylindrical side wall of the piston chamber;
a pneumatic control section which makes the piston member work as at least a part of an opening/closing actuator for opening/closing a fluid channel between the inflow path and the outflow path;
a valve element which is connected to the piston member, and is provided with a diaphragm which defines a partition between a fluid and the pneumatic control section within the valve chamber;
a cylindrical lower stopper that is separate from the cylindrical side wall and that is inserted into the piston chamber from an upper opening as anti-falling off for the diaphragm inserted into the valve chamber from the upper opening, and that is fixed to the cylindrical side wall, and works as a lower guide to support movement of the piston member;
a cylindrical upper stopper that is separate from the cylindrical side wall and that is inserted into the piston chamber from the upper opening as anti-falling off for the piston member inserted into the piston chamber from the upper opening, and that is fixed to the cylindrical side wall, and works as an upper guide to support movement of the piston member; and
wherein the piston chamber is a space defined by at least the cylindrical side wall of the substantially columnar space and the piston member.

2. The pneumatic control valve according to claim 1, wherein the cylindrical lower stopper is fixed by engagement between a concave groove portion provided in an inner wall of the piston chamber and a flanged convex portion provided on an outer wall, and insertion of an anti-rotation pin from the valve body into the cylindrical lower stopper or heat welding between the valve body and the cylindrical lower stopper.

3. The pneumatic control valve according to claim 2, wherein engagement between the concave groove portion and the flanged convex portion separates an upper surface of the diaphragm and a compression chamber of the pneumatic control section.

4. The pneumatic control valve according to claim 1, wherein the cylindrical upper stopper is fixed by insertion of a pin from the valve body into the cylindrical upper stopper or heat welding between the valve body and the cylindrical upper stopper, and anti-rotation obtained by engaging a convex portion on a piston stem side with a concave portion on a stopper side.

* * * * *